F. S. BAILEY.
SUPPORT FOR TURPENTINE STRIPS OR TROUGHS.
APPLICATION FILED NOV. 13, 1915.

1,193,220.

Patented Aug. 1, 1916.

WITNESSES:

INVENTOR
FESTUS S. BAILEY,
BY Munn & Co
ATTORNEYS

UNITED STATES PATENT OFFICE.

FESTUS S. BAILEY, OF QUITMAN, GEORGIA.

SUPPORT FOR TURPENTINE STRIPS OR TROUGHS.

1,193,220. Specification of Letters Patent. Patented Aug. 1, 1916.

Application filed November 13, 1915. Serial No. 61,272.

*To all whom it may concern:*

Be it known that I, FESTUS S. BAILEY, a citizen of the United States, and a resident of Quitman, in the county of Brooks and State of Georgia, have invented a new and useful Improvement in Supports for Turpentine Strips or Troughs, of which the following is a specification.

My invention is an improvement in supports for turpentine strips or troughs, and the invention has for its object to provide a support of the character specified, adapted to be driven into the tree at the scarf, and adapted to support the pail or cup for receiving the drip, and to support the lower end of the spile or trough for conducting the drip to the cup or pail.

Figure 1:
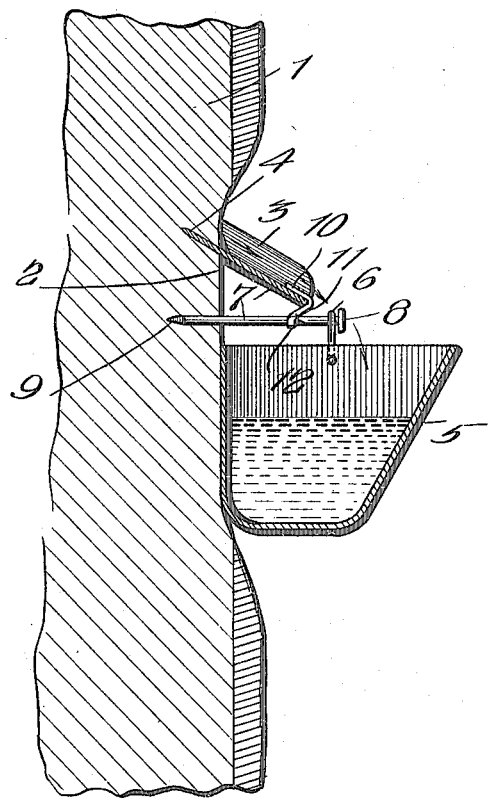
Figure 2:
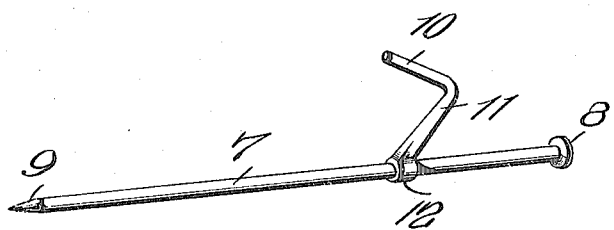

In the drawings: Figure 1 shows a vertical section of a tree with the improved support in place, and Fig. 2 is a perspective view of the support detached.

The present embodiment of the invention is shown in connection with a tree 1, the tree having the usual blaze or scarf 2 through the bark and into the body of the tree and the spile or trough is shown connected with the tree.

The spile or trough 3 is of ordinary construction having a pointed spur or lug 4, which is driven into the wood of the tree to support the spile in inclined position in order that the sap may pass downward through the spile or trough into the receptacle 5 supported below the trough. This receptacle is of the usual form comprising the body 5 and the bail 6, and the improvement not only supports the receptacle but also supports the lower end of the spile or trough.

It is undesirable to nail the strips or spiles 3 to the tree because it is frequently necessary to move the spile to new blaze as for instance higher on the tree. Were the strip nailed it would be necessary to withdraw the nails, and the purpose of the present invention is to provide a firm and rigid support for the lower end of the strip which may be easily removed when it is desired to remove the strip.

The improvement comprises a metal spike 7, having at one end a head 8 and having the other end pointed as indicated at 9, the spike being in fact a nail of that type known as a wire or drawn nail.

A bracket arm is connected with the body of the spike, the said bracket arm consisting of integral portions 10 and 11, extending at an acute angle with respect to each other, the portion 1 having at the end remote from the portion 10 a bearing sleeve or collar 12, which is adapted to encircle the body of the spike and to be secured thereto, if desired, by shrinking, soldering, brazing or the like, or in any other desired manner.

In use, the tree is cut as indicated at 2, and the strip or spile 3 is placed at the upper end of the blaze by driving the spur or lug 4 into the material of the tree, the strip being inclined downwardly toward its outer ends. The spike 7 is driven into the tree just below the free end of the strip with the angular arm 10—11—12 extending upwardly as shown. The spike is driven into the tree far enough so that the outer end of the bottom of the strip or spile will engage the angle between the portions 10 and 11 of the arm and with the portion 10 of the arm extending longitudinally of the bottom of the strip at the center thereof and lying flat on the bottom. The free end of the spile is thus prevented from downward or from upward movement, the portion 10 of the arm preventing upward movement, while the portion 11 on which the free end of the strip rests prevents downward movement of the said free end. The bail 6 of the receptacle 5 may be engaged with the body of the spike near the head to support the receptacle in the position shown. When it is desired to remove the strip it is only necessary to displace the receptacle, withdraw the spike and the strip may then be easily withdrawn and replaced in the same manner.

I claim:—

1. A support for turpentine cups and spiles or strips, comprising a spike having at one end a head and having at the other end a point, the point being adapted to be driven into the wood of the tree with the spike in horizontal position, said spike having an angular arm, the arm consisting of two portions extending at an acute angle, one of the said portions having a bearing sleeve through which the spike body extends, the portion remote from the spike body being adapted to engage above the free end of the spile or strip and in the same with the said free end resting upon that portion adjacent to the spike, the said last-named portion extending at an acute angle with respect to the spike body and toward the head.

2. A support for turpentine cups and spiles or strips, comprising a spike having at one end a head and having at the other end a point, the point being adapted to be driven into the wood of the tree with the spike in horizontal position, said spike having an angular arm, the arm consisting of two portions extending at an acute angle, one of the said portions having a rigid connection with the spike body, the portion remote from the spike body being adapted to engage above the free end of the spile or strip and in the same with the said free end resting upon that portion adjacent to the spike, the said last-named portion extending at an acute angle with respect to the spike body and toward the head.

FESTUS S. BAILEY.

Witnesses:
RUSSELL E. SNOW,
BRANCH FLEMING.

Copies of this patent may be obtained for five cents each, by addressing the "Commissioner of Patents, Washington, D. C."